Dec. 30, 1952 — H. GOLD ET AL — 2,623,509
SPEED-DENSITY TYPE OF FUEL-METERING CONTROL
Filed May 17, 1946 — 2 SHEETS—SHEET 1
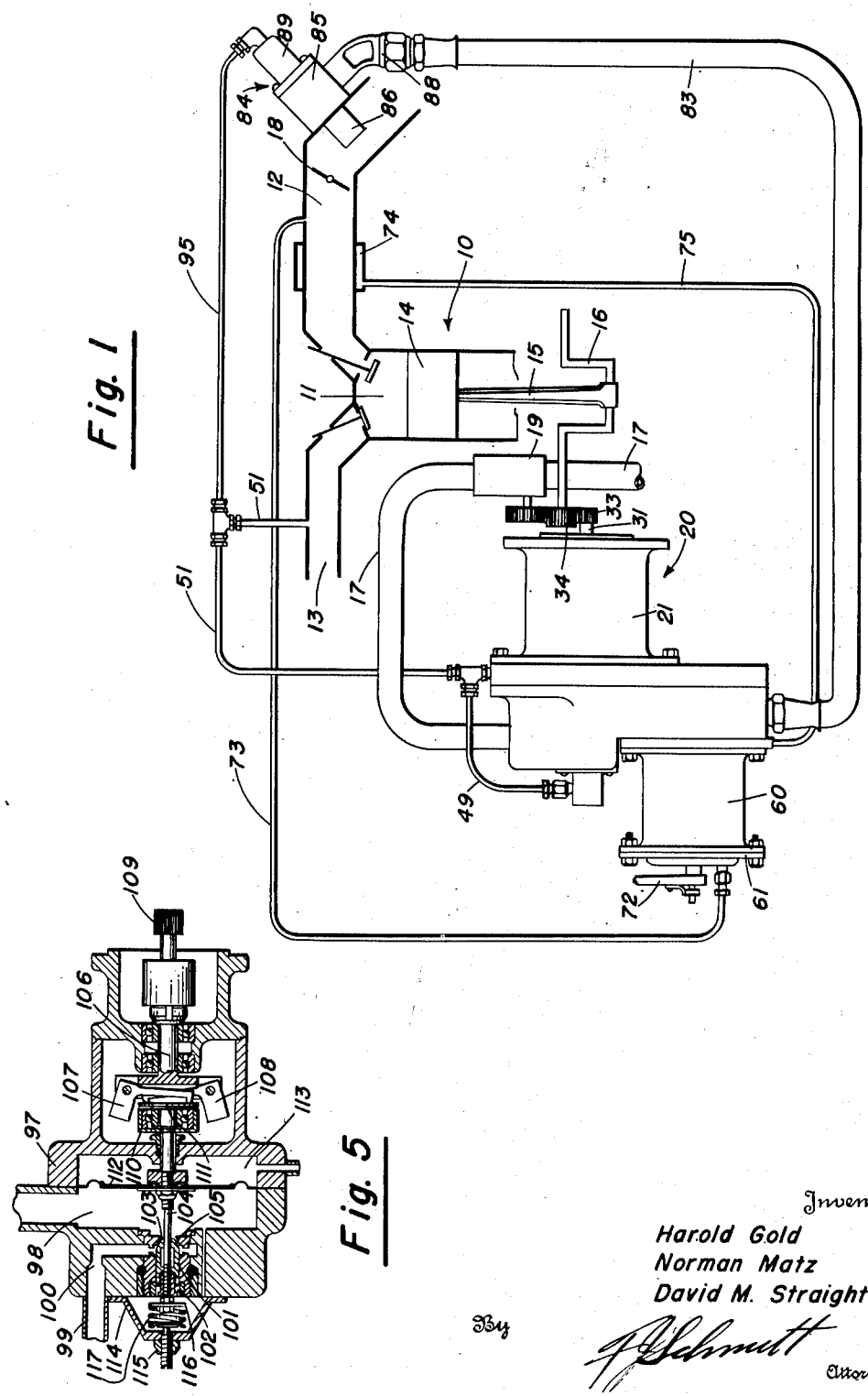
Inventors
Harold Gold
Norman Matz
David M. Straight
By *J. Schmitt*
Attorney Dec. 30, 1952    H. GOLD ET AL    2,623,509
SPEED-DENSITY TYPE OF FUEL-METERING CONTROL
Filed May 17, 1946    2 SHEETS—SHEET 2
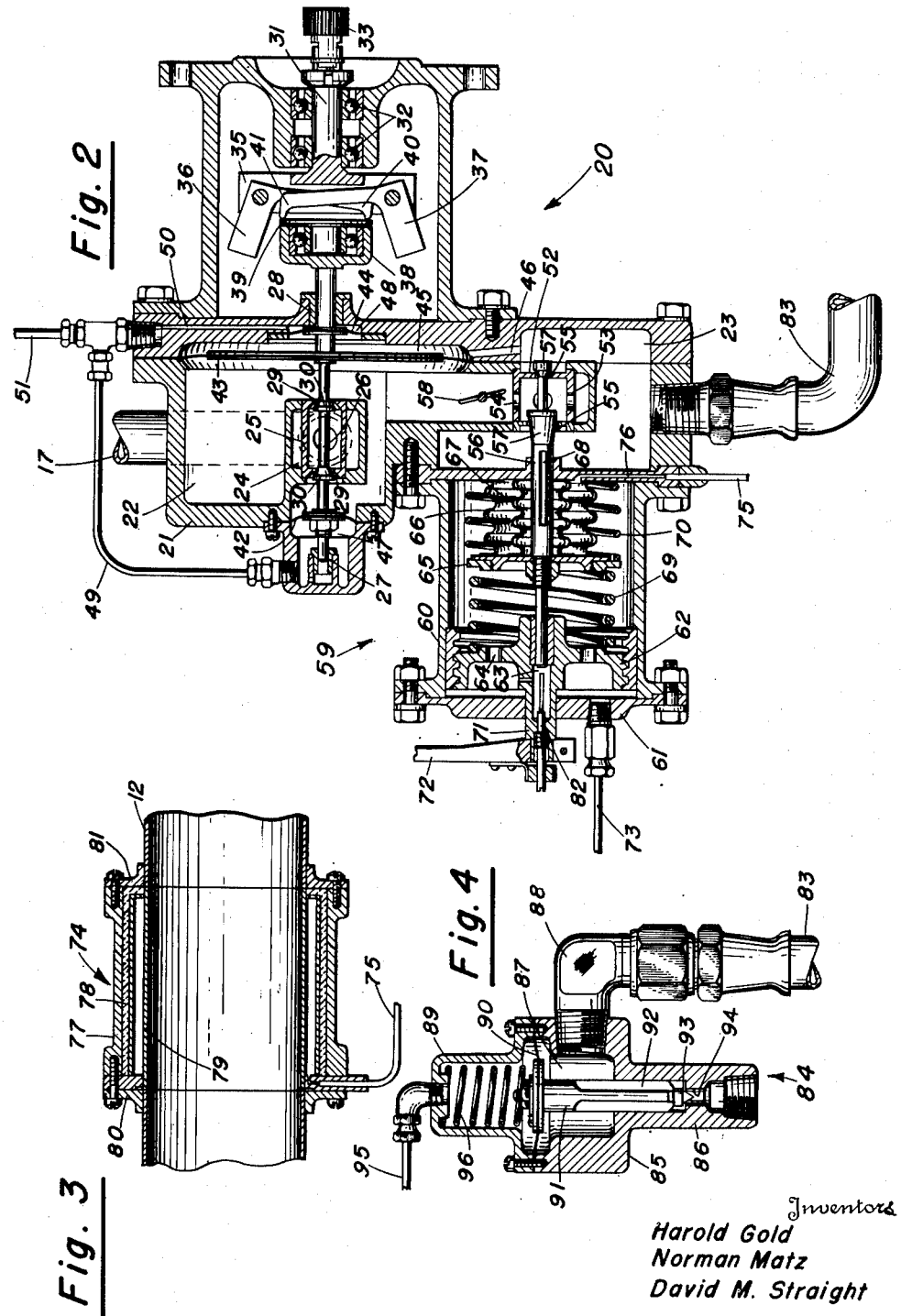
Inventors
Harold Gold
Norman Matz
David M. Straight
By
Attorney Patented Dec. 30, 1952

2,623,509

UNITED STATES PATENT OFFICE 2,623,509

SPEED-DENSITY TYPE OF FUEL-METERING CONTROL

Harold Gold, East Cleveland, Norman Matz, Cleveland, and David M. Straight, Lakewood, Ohio Application May 17, 1946, Serial No. 670,406

5 Claims. (Cl. 123—119)

(Granted under the act of March 3, 1883, as amended April 30, 1928; 370 O. G. 757)

This invention relates to fuel metering devices and more particularly to fuel metering devices for internal combustion engines of the spark ignition type.

In engines of the type referred to, the rate of flow of air to the engine is determined by the parameters (a) intake manifold pressure, (b) intake manifold temperature, (c) exhaust manifold pressure, and (d) crankshaft speed. The relation between the rate of flow of air and the parameters may be expressed as a function of intake-manifold pressure, exhaust-manifold pressure, and intake-manifold temperature, multiplied by a function of engine speed.

For best operating results and to prevent wastage of fuel, the rate of fuel flow must be made to vary in accordance with variations in the rate of air flow. The relation between rate of air flow and the parameters when multiplied by the fuel-air ratio will give fuel flow ratio required for engine operation. For proper engine operation from idle to maximum power, the optimum value of the fuel-air ratio varies on changes in power output, as is hereinafter explained.

The rate of fuel flow through a controlling orifice, which follows the law of the orifice, is the effective area of the orifice multiplied by the square root of the pressure drop across the orifice.

According to the invention, fuel-flow rates for engine operation are obtained by setting up a pressure differential proportional to the square of engine speed and applying this differential pressure across a variable-metering orifice. The area of the variable-metering orifice is adjusted by the parameters, intake-manifold pressure, intake-manifold temperature, and exhaust-manifold pressure. For proper engine operation, a certain value of fuel-air ratio is required for each combination of these parameters. The area of the variable-metering orifice is so varied according to these parameters and also according to the fuel-air ratio corresponding to these parameters that the proper fuel-flow rates are maintained. This can be seen by referring again to the law of the orifice, where in this invention the effective area of the orifice is equal to the product of fuel-air ratio and a function of the parameters, intake-manifold pressure, intake-manifold temperature, and exhaust-manifold pressure, and the pressure drop across the orifice is proportional to the square of engine speed. The fuel flow then is a function of the engine speed (square root of an amount proportional to the square of engine speed) multiplied by a function of the parameters, intake-manifold pressure, intake-manifold temperature, and exhaust-manifold pressure, and multiplied by fuel-air ratio, as was mentioned before, as desired.

Automatic fuel-flow controls have been devised that operate in accordance with the same engine parameters as this invention, but do not incorporate means for compensating for the varying effects of certain of the parameters or compensate for them with considerable complications that tend to detract from over-all control accuracy.

The invention consists of a differential-pressure regulator supplied by fuel under pressure and loaded by centrifugal weights responsive to engine speed; a variable-area-metering orifice positioned by a pressure-sensitive means subject to intake-manifold pressure, a gas pressure proportional to intake-manifold temperature and a fuel pressure proportional to exhaust-manifold pressure; and a fuel-discharge-pressure regulator loaded by exhaust-manifold pressure and a spring.

The invention consists of a combination of a minimum number of components for metering fuel to the engine. The advantages of the invention are that no servo-mechanisms, cams, packing seals, or mechanical linkages are required. This eliminates hysteresis or friction drag and lost motion such as often occurs in mechanical or cam linkages, and the invention is such that all shafts are positively sealed against fuel leakage without the frictional drag of packings. No fuel-return lines are necessary as occurs in the use of servo-mechanisms. A change in engine speed directly results in a change in differential pressure. The area of the variable-metering orifice is directly adjusted by the pressure-sensitive element. These advantages result in an immediate change in fuel flow with change in any of the parameters, thus eliminating the necessity of an acceleration pump.

An object of this invention is to meter fuel according to the various parameters, that is, engine speed, intake-manifold pressure, intake-manifold temperature, and exhaust-manifold pressure, and to correct the fuel flow to the engine to account for the engine volumetric efficiency as it varies with engine speed.

The invention provides three means of adjusting the fuel flow to compensate for varying volumetric efficiency without detracting from the simplicity of the control. One method is to introduce an additional constant load on the differential-pressure regulator either aiding or opposing the load applied by the centrifugal weights. The additional load is applied either by providing seal diaphragms of unequal areas, or by the addition of a spring load. Aiding the centrifugal load corresponds to a decrease in the volumetric efficiency with increase in engine speed; and opposing the centrifugal load corresponds to an increase in the volumetric efficiency with increase in speed. A second method of compensating for a variation of the volumetric efficiency is to introduce a resistance valve in series with the variable metering orifice. This effectively reduces the effective area of the metering orifice by a constant amount. The third method of compensating for a variation of the volumetric efficiency is accomplished by making use of a characteristic of the loading spring in the fuel-discharge-pressure regulator. An increased spring rate of the loading spring will cause the fuel pressure of the fuel flowing to the regulator to vary with the fuel-flow rate. Since the pressure-sensitive element which varies the area of the variable metering orifice is sensitive to this pressure, a resulting change of metering-orifice area will occur. By use of any or all of these compensating means, individually or mutually, it is possible to meter the correct amount of fuel to the engine to account for a variation of the volumetric efficiency. The relation of volumetric efficiency to engine speed depends primarily on the design of the engine to which it is desired to fit the control.

In accomplishing these and other objects of the present invention, we have provided improved details of structure, preferred forms of which are shown in the accompanying drawings, wherein:

Fig. 1 is a schematic view of a portion of an internal combustion engine of the spark ignition type having installed thereon a fuel metering device embodying the features of the present invention;

Fig. 2 is a sectional view of the differential regulator and variable metering orifice employed in the device shown in Fig. 1;

Fig. 3 is a sectional view of a portion of the engine intake manifold showing a temperature sensitive means employed in the device;

Fig. 4 is a sectional view of a discharge regulator employed in the device; and

Fig. 5 is a sectional view of a portion of a modified form of differential regulator.

Referring more in detail to the drawings:

In Fig. 1 there is shown schematically at 10 a portion of an internal combustion engine that comprises a cylinder 11, an intake manifold 12, an exhaust manifold 13, a piston 14, a connecting rod 15, a crankshaft 16, and a fuel line 17. The intake manifold is equipped with a throttle valve 18 and the fuel line contains a pump 19. The structure and operation of the foregoing elements may be conventional and do not per se form a part of the present invention; hence they are not described in further detail.

The fuel metering device, with which the present invention is concerned, is installed in the fuel line between the fuel pump and the intake manifold. The device comprises first a differential regulator, one form of which is designated generally as 20 and is shown in detail in Fig. 2.

The differential regulator includes a housing 21 within which are a first fuel chamber 22 and a second fuel chamber 23. Fuel is admitted to the first chamber from the fuel line through a pressure control valve 24 that includes a valve body 25 fixed to the regulator housing 21 and a reciprocable stem 26 slidably supported in said housing in bearings 27 and 28. The ends of said valve body are open to form metering orifices 29 and a pair of tapered plugs 30 are fixed to the stem 26 in cooperative relation to said orifices in such manner as to vary the effective area of the orifices on reciprocable movement of the stem. It is seen that the effective area of the orifices is increased to permit flow of more fuel on longitudinal movement of the stem to the left, as viewed in Fig. 2, and decreased on movement to the right.

Means are operatively connected with the stem so that its longitudinal position is such that the fuel pressure differential between the fuel in the first chamber 22 and that in the second chamber 23 is a function of engine speed.

Such means include a shaft 31, axially aligned with the stem 26, and rotatably mounted in the housing 21, preferably on ball bearing assemblies 32. Keyed or otherwise fixed to the shaft 31 is a gear 33 that meshes with a gear 34 on the crankshaft 16 (Fig. 1). The shaft 31 is thereby rotated at a speed directly proportional to the engine crankshaft speed. A transverse support member 35 is fixed to the shaft and a pair of centrifugal weights 36 and 37 are pivotally connected to said support member (Fig. 2). The stem 26 has a cup-shaped bearing member 38 affixed to the end adjacent said weights and a bearing plate 39 is rotatably mounted in said member. The plate 39 has a diametric groove in its outer face and the weights carry arms 40 and 41 that have contacting portions riding in said groove. Preferably the arms extend a substantial distance from the pivot point in order that the distance between the contacting positions thereof and the pivot points is sufficiently great so that adjustment of the stem is effected by only a slight movement of the weights. This arrangement is desirable in order that the axial force acting on the stem remains substantially constant regardless of the longitudinal position of the stem within its range of movement.

Fuel in the first chamber 22 may be considered as "unmetered" and is under a higher static pressure than fuel in the second chamber 23, which fuel may be considered "metered." The centrifugal force applied to the stem 26 by the weights is directly proportional to the square of the engine speed and is balanced by the static pressure differential between the fuel in the two chambers.

The stem 26 has rigidly secured thereto flexible diaphragms 42, 43, and 44, the peripheral edges of which are secured to the housing 21. The space 45 between the diaphragms 43 and 44 communicates with the second fuel chamber 23 through an open duct 46. The fuel in the space 45 is therefore under substantially the same pressure as the fuel in the second chamber 23. The space 47 to the left of the diaphragm 42 and the space 48 to the right of the diaphragm 44 are connected to the exhaust manifold 13 through a tube 49 and a duct 50 respectively that communicate to a tube 51 tapped into said manifold (Fig. 1).

It will be appreciated that the exhaust manifold pressure as applied to the differential-pressure regulator 20 serves only as a reference pressure and the forces resulting therefrom acting on stem 26 all cancel one another. This is true regardless of any difference between the effective area of diaphragms 42 and 44.

When the effective area of diaphragm 42 is equal to the effective area of diaphragm 44, the forces resulting from the fuel pressure acting on diaphragms 42 and 44 cancel as well as the forces resulting from the exhaust back pressure, and the differential-regulator-diaphragm system is completely balanced and the pressure differential between unmetered and metered fuel acting on either side of diaphragm 43 is directly proportional to the centrifugal force acting on stem 26, which is directly proportional to the square of engine speed. When it is desired to fit the control on an engine that has a change in the volumetric efficiency with change in engine speed, it becomes necessary to adjust the fuel-flow rates to compensate for it. This is done by aiding or opposing the centrifugal weight load with a constant load. The resulting pressure differential between unmetered and metered fuel would then be an amount proportional to the square of engine speed plus or minus a constant. The resulting fuel flow to the engine would then vary in a hyperbolic relation with engine speed. The magnitude and direction of the constant load is determined by the characteristics of the engine to which it is desired to fit the control. For example, an engine with a characteristic of increasing volumetric efficiency with increase in engine speed requires a constant load opposing the centrifugal load on the stem 26. This is obtained by making the effective area of diaphragm 44 larger than the effective area of diaphragm 42. This causes an unbalance of the forces resulting from the fuel pressure acting on diaphragms 42 and 44 with a resulting load acting to the right in Fig. 2 opposing the centrifugal load.

For an engine with a characteristic of decreasing volumetric efficiency with increase in engine speed a similar analysis is followed with the effective area of diaphragm 42 greater than the effective area of diaphragm 44. In either case, it will be appreciated that the load applied to stem 26 caused by inequality of diaphragm areas will at all engine speeds be a constant load. Therefore, when the forces acting in the differential regulator reach a condition of equilibrium and the stem 26 is brought to rest, stabilizing the flow through the valve 24, the static-pressure differential between chambers 22 and 23 is a function of engine speed, that is, proportional to the square of engine speed plus or minus a constant differential pressure depending on engine characteristics.

From the chamber 22 the fuel flows into the chamber 23 through a variable metering orifice 52. The latter comprises a hollow valve body 53 fixed to the housing 21 and having apertures 54 in its sides through which fuel may enter said body, and apertures 55 in its ends adapted to function as metering orifices. A stem 56 is supported for reciprocable movement in the housing and carries tapered plugs 57 cooperable with the orifices 55 to vary the effective areas thereof on reciprocable movement of said stem, increasing such area on movement to the right and decreasing it on movement to the left.

The second method of compensating for changes of engine volumetric efficiency with speed consists of a resistance valve 58 installed in chamber 22 adjacent the variable metering orifice 52 and comprises a flat plate that is rotatably adjustable manually and includes locking means (not shown). The function of the valve 58 is to aid in adjusting the correct fuel flow rates to the engine when the control is compensated for change in volumetric efficiency by the method of loading the differential regulator 20 as previously described or by the method involving the discharge regulator 84 hereinafter described or the combination of the two methods.

A metering valve control assembly, designated generally as 59, is secured to the housing 21. The assembly 59 includes a cylindrical housing 60 having an end closure plate 61.

A thrust collar 62 is threadedly engaged in the housing 60 for longitudinal adjustment therein and has an axial bore 63 that rotatably and slidably receives the end of the stem 56 and is perforated, as indicated at 64, to permit passage of gases into the interior of the housing 60. A bearing plate 65, also adapted to function as a bellows head, is fixed to said stem intermediate its ends and within the housing 60. Outer and inner concentric extensible bellows 66 and 67 are fixed to said bearing plate and to the housing 21.

The stem 56 has longitudinal grooves 68 in its sides to furnish communication between the chamber 23 and the space within the inner bellows 67. Fuel in the space within the inner bellows is thus under substantially the same pressure as fuel in the chamber 23 and it is seen that increase in such pressure tends to lengthen the bellows to move the stem 56 to the left and thus decrease the effective area of the orifices 55. As explained hereinafter, fuel pressure within the chamber 23 varies as the pressure within the exhaust manifold.

A compression spring 69 extends between the thrust collar 62 and the bearing plate 65 and a second compression spring 70 extends between said bearing plate and the adjacent wall of the housing 21. The degree of compression of said springs may be adjusted by manual rotation of the thrust collar, and the latter has a spindle 71 projecting through the closure plate 61 and equipped with a manually operable handle 72 for effecting such adjustment.

The space within the housing 60 outside of the outer bellows 66 is exposed to the engine intake manifold pressure, being connected to the intake manifold pressure 12 by a tube 73 (Fig. 1). Such pressure acts on the exposed face of the bearing plate 65 and it is seen that increase in intake manifold pressure, such as occurs on increased power output, tends to compress the bellows to move the stem 56 to the right and thus increase the effective areas of the orifices 55.

Provision is made for varying the pressure in the space between the outer and inner bellows in accordance with variations in the temperature of the intake manifold. The intake manifold contains an annular temperature bulb 74 preferably located between the throttle valve 18 and the cylinder 11, and connected to the housing 21 by a tube 75 (Fig. 1). The housing 21 contains a duct 76 communicating between the end of said tube and the space between the bellows.

Fig. 3 shows the details of construction of the preferred form of temperature bulb. The bulb includes an outer shell 77, the inner surface of which is covered by a layer of heat insulating material 78. An annular section of heat conducting material 79 forming an annular sealed bulb space is secured concentrically to the inner surface of the heat insulating material 77. The bulb is secured to the manifold by means of a pair of annular flange members 80 and 81 affixed to the manifold sections. In order not to impede flow through the manifold, the inner surface of the section 79 is flush with the inner surface of said manifold.

The bulb space in the section 79, which is heat insulated by the layer 78, contains a gas and communicates with the tube 75. It is apparent that the pressure of the gas within the bulb varies with its temperature which is equivalent to the temperature in the manifold. Increase in such pressure acts on the bearing member 65 to move it toward the left as viewed in Fig. 2 to decrease the effective area of the orifices 55.

A stop pin 82 is preferably secured within the bore 63 of the thrust collar 62 in position to engage the end of the stem 56 to limit movement to the left thereof to thereby permit some flow of fuel through the orifices 55 when the engine is idling regardless of the other forces acting on the stem. Preferably the stop pin is longitudinally adjustable so that the fuel-air ratio during idling may be manually varied as desired.

As shown in Fig. 1, from the chamber 23 the fuel flows through a line 83 into a discharge regulator 84 mounted on the intake manifold 12 outside of the throttle valve 18

The structure of the preferred form of discharge regulator is shown in detail in Fig 4 Said regulator includes a hollow body 85 having a portion 86 of reduced diameter adapted to be received within the intake manifold The hollow space within the body constitutes a chamber 87 to which the line 83 communicates through a suitable fitting 88.

The outer end of the body 85 is closed by a cap 89. A diaphragm 90 is secured across the chamber 87 between said body and said cap. A stem 91, having longitudinal grooves 92 and tapered tip 93, is secured to said diaphragm. The inner end of the body has an orifice 94 that communicates between the chamber 87 and the intake manifold and said tapered tip extends into said orifice. The effective area of the orifice is varied on longitudinal movement of the stem, being increased as the stem is moved upwardly, as viewed in Fig. 4, and decreased on movement downwardly. A tube 95 communicates between the space within the cap 89 above the diaphragm 90 and the tube 51 connected to the exhaust manifold. A compression spring 96 is fixed in said space and bears against said diaphragm tending to move the stem 91 downwardly.

It is thus seen that fuel in the chamber 87 is under a static pressure proportional to the pressure in the exhaust manifold plus that exerted by the spring 96, and that the effective area of the orifice 94 is decreased on increase in exhaust manifold pressure. Since the chamber 87 in the discharge regulator and the chamber 23 in the differential regulator are connected by the open line 83, fuel in the two chambers is under substantially the same pressure.

The control assembly 59 varies the effective area of the variable-metering orifice 55 by controlling the position of the stem 56 in accordance with variations in the engine parameters, intake-manifold pressure, intake-manifold temperature, and exhaust manifold pressure. The distance moved by the stem for a given change in force acting on the head 65 is controlled by the elastic modulus of bellows 66 and 67 and springs 69 and 70.

The distance moved by the stem for a given change in any of the aforementioned temperatures and pressures is proportional to the force resulting therefrom. The ratio of the distance moved by the stem in response to a change in intake manifold pressure to the distance moved in response to an equal change in exhaust manifold pressure is equal to the ratio of the cross-sectional area of the bellows 66 to that of the bellows 67. The ratio of the distance moved by the stem in response to a given change in intake manifold pressure to the distance moved in response to a given change in intake manifold temperature is controlled by the pressure-temperature ratio of the gas within the bulb 74.

The ratios of the distances moved by the stem 56 for changes in the values of the engine parameters are made proportional to the relative contribution of the parameters to engine air flow. For each position of stem 56 there is a definite combination of the parameters, or a definite air flow, and for each value of this combination of parameters there is a predetermined optimum value of fuel-air ratio. The tapered plugs 57 are so shaped that the effective area of orifices 55 at all times are such that the optimum fuel rate to the engine as determined by fuel-air ratio and engine air flow is maintained. At idling or low engine speeds the value of fuel-air ratio is increased by contact of the stem 56 with stop pin 82 preventing closing of the orifices 55 beyond a predetermined point. At intermediate or usual operating speeds the value of fuel-air ratio is substantially constant with respect to the parameters and air flow. As the engine speed approaches maximum power output or maximum air flow the fuel-air ratio must be increased. This enrichment occurs when the combination of parameters causes the stem 56 to move toward the right until the orifices 55 are nearly wide open. This enrichment is accomplished by shaping the tapered plugs 57 such that the effective area of the metering orifices 55 increases more rapidly with movement of the stem 56 to the right after a predetermined position is reached.

As hereinbefore pointed out, increase in pressure in the exhaust manifold moves the stem 91 in the discharge regulator downwardly to decrease the area of the orifice 94. Such decrease is necessary to compensate increase in static pressure of the fuel within the chamber 87, since such increase in pressure would normally tend to increase the rate of flow through said orifice. Actually such increase should decrease the feed of fuel to the engine and does so by tending to decrease the effective area of the orifices 55.

If it is desired to provide richer or leaner fuel mixtures, the thrust bearing 62 may be adjusted within the cylinder 60. It is evident that adjustment to the right increases the effective orifice openings to provide richer mixtures and adjustment to the left does the reverse.

The positions of stem 56 according to the values of engine parameters as described will provide correct fuel-flow rates to the engine provided its volumetric efficiency does not change with speed. To correct for variations of volumetric efficiency with changes in engine speed the differential pressure across the variable metering orifices 55 may be altered as hereinbefore described or the position of stem 56 may be altered by use of variable fuel pressure acting in small bellows 67.

A substantial spring rate of spring 96 in the discharge regulator 84 will reflect in an appreciable rise in pressure of fuel in chamber 87, line 83, and chamber 23 as the fuel-flow rate increases. This moves stem 56 to the left as the pressure in chamber 23 acts on the area of the small bellows 67. This will tend to decrease the area of the variable metering orifices 55. This action of the control may be used to compensate for a decrease in volumetric efficiency of the engine as engine speed increases.

In the modified construction of differential regulator shown in Fig. 5, the connection between the regulator and the exhaust manifold is eliminated and the functions thereof are accomplished by spring means within the regulator. Except for the elimination of the connection, the modified form of regulator is installed in an engine in the same manner as the regulator shown in Figs. 1 and 2.

The modified regulator includes a housing 97 having a first fuel chamber 98. Fuel is admitted to said chamber from a fuel line 99, duct 100, and pressure control valve 101. Said valve includes a valve body 102, having an outlet orifice 103, and a valve stem 104 mounted for reciprocable movement in the housing and having a tapered plug 105 fixed thereto cooperable with said orifice for varying the effective area thereof on reciprocable movement of said stem. It is seen that the effective area of the orifice is increased on movement of the stem to the left, as viewed in Fig. 5, and decreased on movement to the right.

A shaft 106, axially aligned with the stem, is rotatably mounted in the housing and is equipped with centrifugal weights 107 and 108 and driving gear 109 engageable with a gear on the engine crankshaft. The stem is equipped with a bearing member 110 and the latter with a bearing plate 111 rotatably mounted therein and engageable with the weights 107 and 108 for varying the position of the stem in response to variations in engine crankshaft speed. The shaft, weights, bearing member, and bearing plate are substantially similar to the corresponding elements in the regulator shown in Figs. 1 and 2; hence they are not described in further detail.

1. A diaphragm 112 is fixed adjacent its center to the stem 104 and around its periphery to the housing, thereby forming a pressure chamber 113. The latter chamber is connected to a second fuel chamber, not shown, but substantially similar to the second fuel chamber 23 in the regulator shown in Figs. 1 and 2. The pressure of fuel within the chamber 113 is substantially equal to the pressure in the second chamber and the latter is in turn substantially equal to that in the discharge regulator.

A cap 114 is secured to the housing and a thrust bearing member 115 threadedly engaged therein for longitudinal adjustment and is axially aligned with the stem 104. A collar 116 is secured to the end of the stem and a compression spring 117 bears between said thrust bearing member and said collar. The degree of compression of said spring may be varied by longitudinal adjustment of the thrust bearing member within the cap.

The differential-pressure regulator of Fig. 5, exclusive of spring 117, is completely balanced as was the regulator of Fig. 2 when the seal diaphragms 42 and 44 were of equal area. The spring 117 is included to aid or oppose the centrifugal force acting on stem 104 to obtain the same effect on the differential pressure between chambers 98 and 113 as the unequal diaphragm areas did in the regulator of Fig. 2. The spring applies a substantially constant load on the stem 104 and serves to correct the differential pressure for variations of engine volumetric efficiency with engine speed and causes the fuel flow to the engine to vary in a hyperbolic relation to engine speed.

While we have shown but certain embodiments of our invention, it is apparent that the device is subject to further modification without departing from the spirit of the invention. Therefore, we do not wish to be limited by the disclosure set forth, but only by the scope of the appended claims.

The invention described herein may be manufactured and used by or for the Government of the United States of America for governmental purposes without the payment of any royalties thereon or therefor.

What we claim is:

1. In an internal combustion engine having a fuel source, a fuel metering device comprising a differential regulator having first and second fuel chambers, a first orifice of variable area for admitting fuel to said first chamber from said fuel source and a second orifice means of variable area for admitting fuel from said first chamber to said second chamber, said second orifice means forming the only admission opening to said second chamber, a tubular connection including a single series duct between the first chamber and said second orifice, and a manually controlled valve positioned within said tubular connection, said differential regulator including means for varying the area of said first orifice in direct response to variations in engine speed and pressure differential between said chambers and engine exhaust manifold-pressure, and means for varying the area of said second orifice in response to variations in engine intake manifold temperature and pressure.

2. A valve, and apparatus for positioning the valve in relation to three reference pressures, an automatic pressure-regulating means for one of said reference pressures, said positioning apparatus comprising two bellows, one larger than the other, fastened and sealed concentrically to two parallel heads, said first head rigidly fixed relative to body of said valve and said second head free to move as said bellows are caused to expand or contract, a fluted shaft passing through said first head and slidably held in a bearing therein, said bearing being concentric with said bellows, means fastening said shaft to said second head causing it to move therewith, means connecting said shaft to the moving element of said valve, passages in said valve body so arranged that pressure of fluid on downstream side of said valve is communicated through flutes in said shaft to inside of smaller of said bellows, means communicating flow from said valve to the said automatic pressure-regulating means and the inside of the smaller bellows to cause the pressure of the fluid on the downstream side of said valve to increase or decrease equally with said first reference pressure, thereby causing said valve to move by virtue of motion of said bellows with change in pressure inside smaller of said bellows, a fluid-tight housing enclosing said bellows, means communicating said housing to said second reference pressure whereby said valve is caused to move by virtue of motion of said bellows with change in said second reference pressure outside of larger of said bellows, means communicating to the chamber formed between said two bellows to said third reference pressure whereby said valve is caused to move by virtue of motion of said bellows with change in said third reference pressure in the chamber formed between said two bellows.

3. Apparatus for controlling a pressure differential across a restriction to fluid flow comprising an inlet valve having a stem fixed to the valve for movement therewith and extending in both directions along the path of movement of said valve, said inlet valve opening into a first chamber which is enclosed on one side by a first diaphragm fastened and sealed to said stem and on the opposite side by a second diaphragm of larger effective area than the first, said second diaphragm fastened and sealed to said stem, a second chamber enclosed on one side by said second diaphragm and on the opposite side by a third diaphragm of effective area equal to that of the first, said third diaphragm fastened and sealed to said stem, said stem extending beyond said third diaphragm to contact loading means, means for conveying fluid from said first chamber to said restriction and means communicating said second chamber with downstream side of said restriction, means communicating outer sides of said first and third diaphragms to a common pressure, whereby the balance of forces is such that the difference between the pressures in said first and second chambers bears a straight line proportionality to the load applied to said stem.

4. A fuel-metering device for internal combustion engines comprising a variable metering orifice and a differential regulator for controlling pressure drop across said variable metering orifice, said pressure drop being a function of engine speed, said differential regulator including an engine corrected shaft, centrifugal loading means mounted on said shaft, and a constant loading means aiding or opposing said centrifugal loading means to modify said pressure drop to meet engine fuel-flow requirements including conditions of varying volumetric efficiency, said constant loading means including a chambered housing in which said shaft is mounted for sliding movement, two axially displaced diaphragms mounted between said shaft and housing, one diaphragm being larger than the other in flexible area, and common fluid pressure connections to opposite sides of said diaphragms.

5. A fuel-metering device for internal combustion engines comprising a variable metering orifice and a differential regulator for controlling pressure drop across said variable metering orifice, said pressure drop being a function of engine speed, said differential regulator comprising an inlet valve having a stem extending in both directions along the path of movement of said inlet valve, said inlet valve opening into a first chamber which is enclosed on one side by a first diaphragm fastened and sealed to said stem and on the opposite side by a second diaphragm of larger effective area than the first, said second diaphragm fastened and sealed to said stem, a second chamber enclosed on one side by said second diaphragm and on the opposite side by a third diaphragm fastened and sealed to said stem, said stem extending beyond said third diaphragm to contact centrifugal loading means, means for conveying fluid from said first chamber to said variable metering orifice and means communicating said second chamber with the downstream side of said variable metering orifice, means communicating outer sides of said first and third diaphragms to a common pressure, said first and third diaphragms being of unequal effective areas, whereby the balance of forces is such that a constant load acts on said stem aiding or opposing said centrifugal loading means to modify the pressure difference between said first chamber and said second chamber to meet engine fuel-flow requirements including conditions of varying volumetric efficiency.

HAROLD GOLD.
NORMAN MATZ.
DAVID M. STRAIGHT.

REFERENCES CITED

The following references are of record in the file of this patent:

UNITED STATES PATENTS

| Number | Name | Date |
|---|---|---|
| 2,229,109 | Martin | Jan. 21, 1941 |
| 2,378,036 | Reggio | June 12, 1945 |
| 2,378,037 | Reggio | June 12, 1945 |
| 2,419,171 | Simpson et al. | Apr. 15, 1947 |
| 2,422,808 | Stokes | June 24, 1947 |
| 2,435,902 | Reggio | Feb. 10, 1948 |
| 2,438,663 | Greenland | Mar. 30, 1948 |
| 2,440,567 | Armstrong et al. | Apr. 27, 1948 |

FOREIGN PATENTS

| Number | Country | Date |
|---|---|---|
| 429,682 | Great Britain | June 4, 1935 |
| 560,196 | Great Britain | Mar. 24, 1944 |
| 611,312 | Great Britain | Oct. 28, 1948 |